United States Patent Office 2,975,095
Patented Mar. 14, 1961

2,975,095

REINFORCED RUBBER ARTICLES

Nelson C. Bletso, Kent, Ohio, assignor to The Goodyear Tire & Rubber Company, Akron, Ohio, a corporation of Ohio No Drawing. Filed May 23, 1955, Ser. No. 510,506

4 Claims. (Cl. 154—140)

This invention relates to the adhesive bonding of reinforcing elements to rubber and more particularly to the preservation of the adhesive bond, especially under severe heat-generating conditions.

In the manufacture of rubber articles including pneumatic tires and mechanical rubber goods, the life of these articles depends to a great extent upon the reinforcement employed and the ability to properly join the reinforcing material to the rubber.

The reinforcing material is usually a fabric made of cords which in turn may be made of a natural textile material as, for example, cotton; or a cellulosic material as, for example, rayon; or a synthetic material as, for example, a polyamide reaction product, commonly referred to as nylon; or a linear polyester reaction product, commonly referred to as Dacron and Mylar.

Each material presents a different problem in adhesion. Some adhesives are better than others in bonding a particular material to a particular rubber. Natural rubber latex adhesives have been improved by the addition of a protein, such as casein, to the latex, and this improved adhesive has been further improved by the use of a resinous material, such as a heat-hardenable phenol-aldehyde reaction product, either used with or in place of the protein, and these adhesives have been still further improved by the use of various synthetic rubber lattices including the rubbery copolymer of styrene and 1,3-butadiene, also known as GR–S, and the rubbery copolymers of vinyl pyridine and a 1,3-diene monomer, used either in combination with or in place of the natural rubber latex.

Regardless of the materials used in the construction of the rubber article, it is important to the life of the article that the adhesive be preserved during the manufacture of the article and that the adhesive bond be preserved in service. It has often been observed that the article will fail in service through separation of the cord or fabric from the rubber long before the useful life of either has been spent.

It has now been discovered that the adhesive can be protected and that the adhesive bond between the cord and the rubber being reinforced can be preserved throughout the useful life of the rubber and the cord by the use of an adhesive-bond-preserving agent when concentrated at the outer surface of the adhesive carried on the cord and equally important when concentrated at the interface of the adhesive and the rubber being reinforced.

Many adhesive-bond-preserving agents are useful in this invention when these agents are assembled with the other components of the rubber article in such a way as to become concentrated at the interface of the adheive and the rubber being reinforced in the finished article. Amides are particularly useful in this invention, especially the amides of carbonic acid. It has been discovered that carbamide, also referred to as urea, is especially useful in the protection or preservation of the adhesive bond between, for example, a rayon cord and the rubber being reinforced thereby.

Other adhesive bond-preserving agents exhibiting improvement of an equivalent nature to that produced by urea include thiourea, ethylene thiourea, amines such as disalicylal propylene diamine, mixtures of N,N'-aryl disubstituted p-phenylene diamines, N,N'-diphenyl-p-phenylene diamine, 2-mercaptobenzimidazole, o-o'-dihydroxy benzanilide, biuret, dithiobiuret, the resinous reaction product of aniline and formaldehyde, the reaction product of acrylonitrile and tetraethylene pentamine, and the reaction product of guaiacol, morpholine and fomaldehyde and blends of these agents.

In order to set forth more clearly the purpose of the invention, it will be described with reference to rayon cord; but it is to be understood that any synthetic cord may be treated in accordance with the purpose of this invention, as well as cotton cord and fabric made from such cord.

The bonding agents or adhesives that may be used in the treatment of the reinforcing cords are those comprising an aqueous solution of a resin-forming material, specific well-known materials being the heat-hardenable aldehyde resins, especially those aldehyde-phenol condensation resins in which formaldehyde and phenol or resorcinol are used as the preferred reactants and as described in greater detail in U.S. Patent 2,128,229. Although the aldehyde-phenol resin may be used alone, it is preferred to use it in combination with a synthetic or natural rubber latex. The rubber to resin ratio in the final adhesive composition may range from 6:1 to 2:1 parts by weight. The cord-treating composition may also contain other materials such as a protein, for example casein, gelatin, wheat protein, dried blood; wetting agents, other synthetic resins, carbon black, artificial dispersion of rubber, water soluble adhesives and the like which may be added for a variety of purposes. These cord-to-rubber adhesives are benefited when the bond-preserving agents of this invention are concentrated at the interface of the particular adhesive used and the rubber being reinforced.

The method of concentrating the adhesive bond-preserving agent at the interface of the adhesive and the rubber being reinforced, consists of first dipping the cord in a relaxed condition in a predip of a dilute solution of a bonding agent containing from about 1.0% to 10% solids and preferably from 5% to about 10% solids. The excess of dip is removed by any conventional mechanical means as by passing the dipped cord through squeeze rolls or treating the cord with jets of air. During this treatment the cord is maintained in a relaxed condition in order to insure the cord being thoroughly wetted out in a period of about 3 minutes from the time the cord is dipped until it is dipped a second time. During this period the cord has wetted out to the extent that the dip solids have diffused inwardly toward the center of the cord with a maximum of the solids being concentrated toward the outer surface of the cord. At the end of this period these solids have set up sufficiently to prevent penetration of the solids of the second dip into the cord structure. Generally removal of up to about 80% of the water content of the pre-dip picked up by the cord is enough to bring about a partial drying of the cord or the desired degree of set of these solids picked up in the first dip. The cord is then dipped under tension in a second solution of the bonding agent containing from about 10 to about 25% solids and containing the adhesive bond-preserving agent, and then the treated cord is dried under the same tension applied during the second dipping operation.

If the cord has the characteristic of shrinking in water, no attempt is made to prevent shrinkage during the initial dip. Since the cord is in a relaxed condition or under enough tension to prevent kinking of the cord during the initial dip and soak period, the volume of the cord is increased due to lateral swelling of the filaments and therefore the degree of penetration and the volume and amount of solids which the vehicle of the adhesive composition can carry into the interstices is increased. The low tension is maintained for the duration of the initial dipping operation. If the duration of the dipping operation is not long enough to obtain maximum wetting and penetration, the low tension may be maintained for a sufficient time thereafter to insure maximum wetting-out of the cord and penetration of the solution into the interstices of the cord. Most commercially available cord will wet out in at least three minutes.

The concentration of the adhesive-bond-preserving agent present in the second dip may range from .5% to 10% depending upon the particular agent being used, in most cases, however, from 1% to 5% is preferred. When urea is used as the bond-preserving agent, 3% is preferred.

After the second dip containing the bond-preserving agent is applied to the cord under tension, the cord is heated to dry set or harden the bonding agent. The increased tension applied during the second dip is also maintained during the drying operation. Thereafter the cord is embedded in commercially compounded rubber stock by well-known methods of calendering to form a cord and rubber assembly which may be used to build tires, belts, and similar industrial rubber articles to be subsequently cured under pressure and temperature.

In order to more clearly illustrate the advantages and the scope of this invention, the following example is given:

A basic adhesive dip was prepared using the following ingredients, all parts being by weight unless otherwise indicated:

| | Parts |
|---|---|
| Water | 79.80 |
| GR–S latex solids (75/25 styrene/butadiene rubbery copolymer) | 17.00 |
| Resorcinol | 2.03 |
| Formaldehyde | 0.97 |
| Sodium hydroxide | 0.20 |

The basic dip was made by adding the resorcinol to the water and then the formaldehyde was added to the water, followed by addition of the sodium hydroxide and then the latex. The mixture was allowed to age for from 12 to 16 hours. A pre-dip solution of adhesive was prepared by diluting the basic dip with 7 parts of water for each part of basic dip. Rayon tire cord was treated with the pre-dip adhesive by passing the cord into the pre-dip under a tension of 21 grams and at a rate which permitted the cord to become wetted out and partially dried in a period of 3 minutes at a room temperature of 72° F.

The partially dried pre-dipped cord was then treated with a post-dip comprising the basic dip to which had been added 3% of urea by passing the cord into the post-dip at a rate to pick up 7% of dried solids while the cord was held under a tension of 400 grams. The cord was then dried at 300° F. for 5 minutes to heat-set the adhesive. A control cord was made in the same manner as described above except that no urea was added to the post-dip.

The cord as now treated was then embedded in natural rubber compounded as follows:

| | Parts |
|---|---|
| Natural rubber | 100.00 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

Test block samples of the treated cord embedded in the compounded rubber above for hot drop adhesion tests and hot dynamic adhesion tests were made by embedding a ⅜ inch length of the cord in a rubber block ⅜ of an inch wide and 1 inch long and ⅛ of an inch thick. The rubber was cured onto the cord for 20 minutes at 290° F. It took 8.9 minutes for the sample to fail in hot drop adhesion when subjected to a static pull of 5 pounds at 300° F. compared to 3.3 minutes for the control, and it took 24.2 minutes for the sample to fail in hot dynamic adhesion compared to 14.6 minutes for the control. Tube samples of the treated cord embedded in rubber to form a ply of fabric were prepared and tested in the Mallory fatique testing machine as described in U.S. Patent 2,412,524 and found to have a fatigue life of 992.5 kilocycles compared to 904.0 kilocycles for the control, and a ply separation life of 123.7 kilocycles compared to 80.3 kilocycles for the control. The tensile strength of the treated cord was 22.3 pounds compared to 21.8 pounds for the control cord.

The hot dynamic adhesion tests were made by securing the test block samples in a holding means in such a manner that the single cord extending horizontally from each side of the block of rubber is attached to different weights, one being 4.5 pounds, the other being 1.7 pounds. The holding means moves the test block sample from neutral position first ⅛ of an inch toward one weight, then back to neutral position, and then ⅛ of an inch toward the other weight at the rate of 1725 cycles per minute. Thus the shear stress at the interface of the adhesive and the rubber is developed by a force that changes direction 3450 times a minute while the sample is maintained at a temperature of 250° F. The number of minutes the sample will withstand this strain before the cord comes loose from the rubber is a measure of its hot dynamic life.

The tube samples used in making the separation tube test are made of two plies of calendered fabric, the fabric in each ply being made of cord treated with urea as noted above. The samples were made and tested in a manner similar to that described in Mallory U.S. Patent 2,412,524.

Although the invention has been specifically described with reference to natural rubber as the material being reinforced, any compounded natural rubber stock or any compounded synthetic rubber stock may be used, including the polymers of butadiene-1,3, isoprene, 2-chlorobutadiene-1,3, isobutylene, and interpolymers of these and similar materials with each other or with such interpolymerizable monomers as styrene, acrylonitrile, methacrylonitrile, methyl methacrylate, ethyl methacrylate, and 2-vinyl pyridine. In its preferred and common form the invention contemplates any commercial compounded rubber stock employed in the manufacture of pneumatic tires, hose, conveyor belts and other industrial reinforced-rubber products. The rubbery material may also include any of the well-known compounding ingredients for rubber, such as vulcanizing agents and accelerators, antioxidants, fillers, reinforcing agents, emulsifiers, stabilizers, modifiers, and coloring agents, etc., in amounts and proportions in accordance with conventional compounding technique.

The present invention is particularly useful in connection with the treatment of rayon cord, since rayon cord is affected by certain of the adhesive bond-preserving agents, particularly urea, causing the cord to be weakened in tensile. The present invention prevents weakening of the rayon cord by concentrating the urea at the interface of the adhesive and the rubber and out of contact with the cord.

It is to be understood that by the phrase "adhesive-bond-preserving agent" is meant the particular agent used or the decomposition products, if any, resulting from the vulcanization of the cord reinforced rubber article containing the particular agent. Thus, when urea is used in a cord reinforced rubber article which is vulcanized at about 300° F., the urea will decompose to ammonia and cyanic acid.

While certain representative embodiments and details have been shown for the purpose of illustrating the invention, it will be apparent to those skilled in this art that various changes and modifications may be made therein without departing from the spirit or scope of the invention.

What is claimed is:

1. A vulcanized rubber article reinforced with a cord bonded to the rubber by means of an adhesive comprising a rubber latex and a heat-hardenable phenol-formaldehyde condensation product coated on the cord and forming a barrier to the penetration of other solids to the surface of the cord, and as an adhesive-bond-preserving agent the amides of carbonic acid deposited on the adhesive at the interface of the adhesive and the rubber and out of contact with the cord, and present in an amount sufficient to preserve the bond produced by the cord-to-rubber adhesive.

2. A rubber article reinforced with a cord bonded to the rubber by means of an adhesive comprising a rubber latex and a heat-hardenable phenol-formaldehyde condensation product coated on the cord and forming a barrier to the penetration of other solids to the surface of the cord, and urea deposited on the adhesive at the interface of the adhesive and the rubber and out of contact with the cord.

3. A rubber article reinforced with a rayon cord bonded to the rubber by means of an adhesive comprising a rubber latex and a heat-hardenable phenol-formaldehyde condensation product coated on the cord and forming a barrier to the penetration of other solids to the surface of the cord, and urea deposited on the adhesive at the interface of the adhesive and the rubber and out of contact with the cord.

4. A rubber article reinforced with a cord bonded to the rubber by means of an adhesive coated on the cord and forming a barrier to the penetration of other solids to the surface of the cord, and deposited on the adhesive at the interface of the adhesive and the rubber and out of contact with the cord a bond preserving agent selected from at least one of the group consisting of urea, thiourea, ethylene thiourea, disalycylal propylene diamine, N,N'-aryl disubstituted p-phenylene diamines, N,N'-diphenyl-p-phenylene diamine, 2-mercaptobenzimidazole, o-o'-dihydroxy benzanilide, biuret, dithiobiuret, the resinous reaction product of aniline and formaldehyde, the reaction product of acrylonitrile and tetraethylene pentamine, and the reaction product of guaiacol, morpholine and formaldehyde.

References Cited in the file of this patent

UNITED STATES PATENTS

| | | |
|---|---|---|
| 2,060,343 | Palicki | Nov. 10, 1936 |
| 2,097,417 | Neiley | Oct. 26, 1937 |
| 2,128,229 | Charch et al. | Aug. 30, 1938 |
| 2,128,635 | Charch et al. | Aug. 30, 1938 |
| 2,211,945 | Charch | Aug. 20, 1940 |
| 2,211,959 | Maney | Aug. 20, 1940 |
| 2,278,284 | Reese | Mar. 31, 1942 |
| 2,278,285 | Reese | Mar. 31, 1942 |
| 2,404,758 | Teague et al. | July 23, 1946 |
| 2,571,345 | D'Ianni | Oct. 16, 1951 |
| 2,599,359 | Banks et al. | June 3, 1952 |
| 2,628,928 | Cadous | Feb. 17, 1953 |
| 2,657,162 | Tibenham | Oct. 27, 1953 |
| 2,691,614 | Wilson | Oct. 12, 1954 |